(12) United States Patent
Alspector et al.

(10) Patent No.: US 7,624,274 B1
(45) Date of Patent: Nov. 24, 2009

(54) DECREASING THE FRAGILITY OF DUPLICATE DOCUMENT DETECTING ALGORITHMS

(75) Inventors: Joshua Alspector, Chantilly, VA (US); Aleksander Kolcz, Fairfax, VA (US); Abdur R. Chowdhury, Oakton, VA (US)

(73) Assignee: AOL LLC, a Delaware Limited Company, Dulles, VA (US)

( * ) Notice: Subject to any disclaimer, the term of this patent is extended or adjusted under 35 U.S.C. 154(b) by 924 days.

(21) Appl. No.: 11/016,928

(22) Filed: Dec. 21, 2004

Related U.S. Application Data

(60) Provisional application No. 60/543,283, filed on Feb. 11, 2004, provisional application No. 60/562,298, filed on Apr. 15, 2004, provisional application No. 60/580,377, filed on Jun. 18, 2004.

(51) Int. Cl.
*H04L 9/32* (2006.01)
*B41K 3/38* (2006.01)
*G06F 3/00* (2006.01)
*G06F 11/00* (2006.01)
*G06F 12/14* (2006.01)
*G06F 12/16* (2006.01)
*G08B 23/00* (2006.01)
*G06F 7/04* (2006.01)
*G06F 17/30* (2006.01)
*H04N 7/16* (2006.01)

(52) U.S. Cl. ............... 713/176; 713/180; 380/59; 715/752; 726/22; 726/26

(58) Field of Classification Search ............ 762/22, 762/26; 713/176, 180; 380/59; 715/752; 709/204–207
See application file for complete search history.

(56) References Cited

U.S. PATENT DOCUMENTS

| | | | |
|---|---|---|---|
| 5,619,709 A | 4/1997 | Caid | |
| 6,621,930 B1 * | 9/2003 | Smadja | 382/224 |
| 6,658,423 B1 * | 12/2003 | Pugh et al. | 707/102 |
| 2003/0221166 A1 | 11/2003 | Farahat | |
| 2006/0294077 A1 | 12/2006 | Bluhm | |

OTHER PUBLICATIONS

Application filed Dec. 21, 2004 (U.S. Appl. No. 11/016,930).
Office Action dated May 24, 2007 (U.S. Appl. No. 11/016,930).
Application filed Dec. 21, 2004 (U.S. Appl. No. 11/016,959).
Office Action dated May 31, 2007 (U.S. Appl. No. 11/016,959).

(Continued)

*Primary Examiner*—David García Cervetti
*Assistant Examiner*—Oscar A Louie
(74) *Attorney, Agent, or Firm*—Fish & Richardson P.C.

(57) ABSTRACT

In a signature-based duplicate detection system, multiple different lexicons are used to generate a signature for a document that comprises multiple sub-signatures. The signature of an e-mail or other document may be defined as the set of signatures generated based on the multiple different lexicons. When a collection of sub-signatures is used as a document's signature, two documents may be considered as being duplicates when a sub-signature generated based on a particular lexicon in the collection for the first document matches a signature generated based on the same lexicon in the collection for the second document.

18 Claims, 7 Drawing Sheets

OTHER PUBLICATIONS

Androutsopoulos et al., An Evaluation of Naive Bayesian Anti-Spam Filtering, Proceedings of the Workshop on Machine Learning in the New Information Age: 11th European Conference on Machine Learning (ECML 2000), G. Potamias, V. Moustakis, and M. van Someren, eds., 2000, pp. 9-17.

Bilenko et al., Learning to Combine Trained Distance Metrics for Duplicate Detection in Databases, Tech. Rep. A1 02-296, Artificial Intelligence Lab, University of Texas at Austin, 2002, pp. 1-19.

Breiman, Bagging Predictors, Machine Learning, 24 (1996), pp. 123-140.

Brin et al., Copy Detection Mechanisms for Digital Documents, Proceeding of SIGMOD, 1995, pp. 398-409.

Broder, On the Resemblance and Containment of Documents, SEQS: Sequences '97, 1998, pp. 21-29.

Broder et al., Syntactic Clustering of the Web, Computer Networks and ISDN Systems 29, 1997, pp. 1157-1166.

Buckley et al., The Smart/Empire Tipster IR System, Proceedings—Tipster Text Program Phase III, 2000, pp. 107-121.

Chowdhury et al., Collection Statistics for Fast Duplicate Document Detection, ACM Transactions on Information Systems, 20 (2002), pp. 171-191.

Cooper et al., A Novel Method for Detecting Similar Documents, Proceedings of the 35th Hawaii International Conference on System Sciences, 2002.

Graham-Cummings, The Spammers' Compendium, Proceedings of the Spam Conference, Jan. 17, 2003, pp. 1-17.

Gionis et al., Similarity Search in High Dimensions via Hashing, Proceedings of the 25th International Conference on Very Large Databases (VLDB), 1999, pp. 518-529.

Fetterly et al., On the Evolution of Clusters of Near-Duplicate Web Pages, Proceedings of the First Latin American Web Congress, 2003, pp. 37-45.

Fawcett, "In vivo" Spam Filtering: a Challenge Problem for KDD, SIGKDD Explorations, vol. 5, Issue 2, (2003), pp. 140-148.

Drucker et al., Support Vector Machines for Spam Categorization, IEEE Transactions on Neural Networks, vol. 10, No. 5, Sep. 1999, pp. 1048-1054.

Hall, A Countermeasure to Duplicate-Detecting Anti-Spam Techniques, AT&T Labs Technical Report 99.9.1, AT&T Corp., 1999, pp. 1-26.

Haveliwala et al., Scalable Techniques for Clustering the Web, Proceedings of WebDB 2000, 2000.

Heintze, Scalable Document Fingerprinting, The USENIX Association, Proceedings of the Second USENIX Workshop on Electronic Commerce, Nov. 1996, pp. 191-200.

Hernandez et al., The Merge/Purge Problem for Large Databases, Proceedings of the SIGMOD Conference, 1995, pp. 127-138.

Hoad et al., Methods for Identifying, Versioned and Plagiarised Documents, Journal of the American Society for Information Science and Technology, 2002, pp. 203-215.

Ilyinsky et al., An Efficient Method to Detect Duplicates of Web Documents With the Use of Inverted Index, Proceedings of the Eleventh International World Wide Web Conference, 2002.

Kleinberg, Bursty and Hierarchical Structure in Streams, Proceedings of the Eighth ACM SIGKDD International Conference on Knowledge Discovery and Data Mining (KDD-2002), 2002, pp. 1-25.

Kolcz et al., Data Duplication: An Imbalance Problem 2, Proceedings of the ICML '2003 Workshop on Learning from Imbalanced Datasets (11), 2003.

Kolcz et al., SVM-Based Filtering of E-Mail Spam With Content-Specific Misclassification Costs, Proceedings of the Workshop on Text Mining (TextDM'2001), 2001, pp. 1-14.

Kwok, A New Method of Weighting Query Terms for Ad-Hoc Retrieval, Computer Science Department, Queens College, City University of New York, Flushing NY.

McCallum et al., Efficient Clustering of High-Dimensional Data Sets With Application to Reference Matching, Proceedings of the Sixth ACM SIGKDD International Conference on Knowledge Discovery and Data Mining (KDD-2000), 2000.

Robertson et al., Okapi at TREC-7: Automatic Ad Hoc, Filtering, VLC and Interactive, Proceedings of the 7th Text Retrieval Conference, 1998, pp. 253-264.

Sahami et al., A Bayesian Approach to Filtering Junk E-Mail, Proceedings of the AAAI-98 Workshop on Learning for Text Categorization, 1998.

Salton et al., A Vector-Space Model for Information Retrieval, Communications of the ACM, vol. 18, No. 11, Nov. 1975, 613-620.

Sanderson et al., Duplicate Detection in, the Reuters Collection, Tech. Rep. TR-1997-5, Department of Computing Science, University of Glasgow, 1997, pp. 11.

Shivakumar et al., Finding Near-Replicas of Documents on the Web, WEBDB: International Workshop on the World Wide Web and Databases, WebDB, LNCS, 1999.

Singhal et al., Pivoted Document Length Normalization, Proceedings of the Nineteenth Annual International ACM SIGIR Conference on Research and Development in Information Retrieval, 1996.

Winkler et al., The State of Record Linkage and Current Research Problems, Tech. Rep., Statistical Research Division, U.S. Bureau of Census, Washington, DC, 1999.

Androutsopoulos et al., Learning to Filter Unsolicited Commercial E-Mail. Technical Report 2004/2, NCSR Demokritos, 2004, pp. 1-52.

Baker et al., Distributional Clustering of Words for Text Classification, Proceedings of SIGIR-98, 21st ACM international Conference on Research und Development in Information Retrieval, 1998, pp. 96-103.

Carreras et al., Boosting Trees for Anti-Spam Email Filtering, Proceedings of RANLP-01, 4th International Conference on Recent Advances in Natural Language Processing, Tzigov Chark, BG, 2001.

Slonim et al., The Power of Word Clusters for Text Classification, 23rd European Colloquium on Information Retrieval Research, 2001, pp. 1-12.

Yerazunis, Sparse Binary Polynomial Hashing and the CRM114 Discriminator, MIT Spam Conference, 2003.

Zhou et al., Approximate Object Location and Spam Filtering on Peer-to-Peer Systems, Proceedings of ACM/IFIP/USENIX International Middleware Conference (Middleware 2003), 2003, pp. 1-20.

* cited by examiner

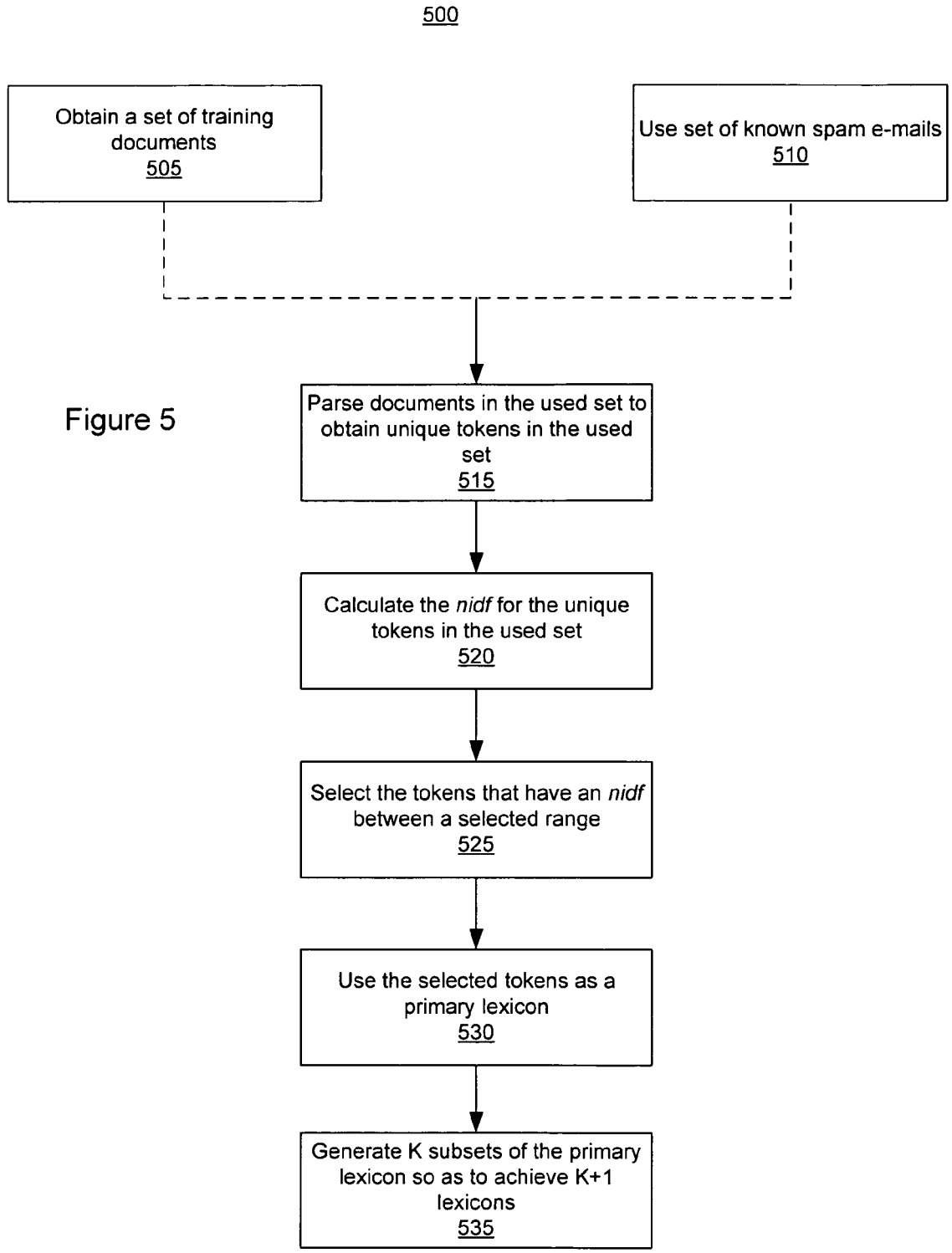

US 7,624,274 B1

DECREASING THE FRAGILITY OF DUPLICATE DOCUMENT DETECTING ALGORITHMS

CLAIM OF PRIORITY

This application claims priority under 35 USC § 119(e) to U.S. Provisional Patent Application Ser. No. 60/543,283, filed on Feb. 11, 2004; Ser. No. 60/562,298, filed on Apr. 15, 2004; and Ser. No. 60/580,377, filed on Jun. 18, 2004, all of which are hereby incorporated by reference.

TECHNICAL FIELD

This description relates to duplicate detection and spam filtering.

BACKGROUND

With the advent of the Internet and a decline in computer prices, many people are communicating with one another through computers interconnected by networks. A number of different communication mediums have been developed to facilitate such communications between computer users. One type of prolific communication medium is electronic mail (e-mail).

Unfortunately, because the costs of sending e-mail are relatively low, e-mail recipients are being subjected to mass, unsolicited, commercial e-mailings (colloquially known as e-mail spam or spam e-mails). These are akin to junk mail sent through the postal service. However, because spam e-mail requires neither paper nor postage, the costs incurred by the sender of spam e-mail are quite low when compared to the costs incurred by conventional junk mail senders. Due to this and other factors, e-mail users now receive a significant amount of spam e-mail on a daily basis. Spam e-mail impacts both e-mail users and e-mail providers. For e-mail users, spam e-mail can be disruptive, annoying, and time consuming. For an e-mail service provider, spam e-mail represents tangible costs in terms of storage and bandwidth usage. These costs may be substantial when large numbers of spam e-mails are sent.

SUMMARY

In general, when detecting a duplicate document, at least a first and second lexicon of attributes are generated and the unique attributes in a document are determined. A first set of intersection attributes are determined based on an intersection between the unique attributes in the document and the first lexicon. Also, a second set of intersection attributes are determined based on an intersection between the unique attributes in the document and the first lexicon. A first sub-signature is calculated based on the first set of intersection attributes and a second sub-signature is calculated based on the second set of intersection attributions. A signature of the document is set equal to the first and second sub-signatures.

Implementations may include one or more of the following features. For example, the document may be an unknown document and the signature may be a query signature. The query signature may be compared to known signatures generated from a set of known documents to determine whether the unknown document is a duplicate of one of the set of known documents.

Comparing the query signature to known signatures generated from a set of known documents may include determining whether a sub-signature in the query signature is the same as a sub-signature in one of the known signatures. Determining if a sub-signature in the query signature is the same as a sub-signature in one of the known signatures may include determining whether a sub-signature in the query signature that was generated based on an intersection between the unique tokens and one of the multiple lexicons is the same as a sub-signature in the known signature that was generated based on an intersection between unique tokens in a known document and the same one of the multiple lexicons.

The document may be an e-mail and the unique attributes may include tokens. The tokens may include words in a body of the e-mail. The e-mail may be a known spam e-mail and the signature of the known spam e-mail may be a spam signature for use in detecting a duplicate spam e-mail.

The attributes in the first and second lexicons and the unique attributes may include words.

To generate the first lexicon of attributes and the second lexicon of attributes, a set of documents may be parsed to obtain unique attributes in the set of documents. The normalized inverse document frequency for the unique attributes in the set of documents may be calculated and the unique attributes in the set of documents that have a normalized inverse document frequency within a selected range may be used to generate the first lexicon. The second lexicon may be generated by eliminating a fraction of attributes from the first lexicon. The fraction may be a random fraction. The set of documents may be a set of known spam e-mails and/or a set of training documents.

Implementations of the described techniques may include hardware, a method or process, or computer software on a computer-accessible medium.

The details of one or more implementations are set forth in the accompanying drawings and the description below. Other features will be apparent from the description and drawings, and from the claims.

DESCRIPTION OF DRAWINGS

FIG. 5 is a flowchart of an exemplary implementation of actions 405 in FIG. 4 for an implementation of the process of FIG. 4 based on the I-Match approach.

DETAILED DESCRIPTION

Figure 1:
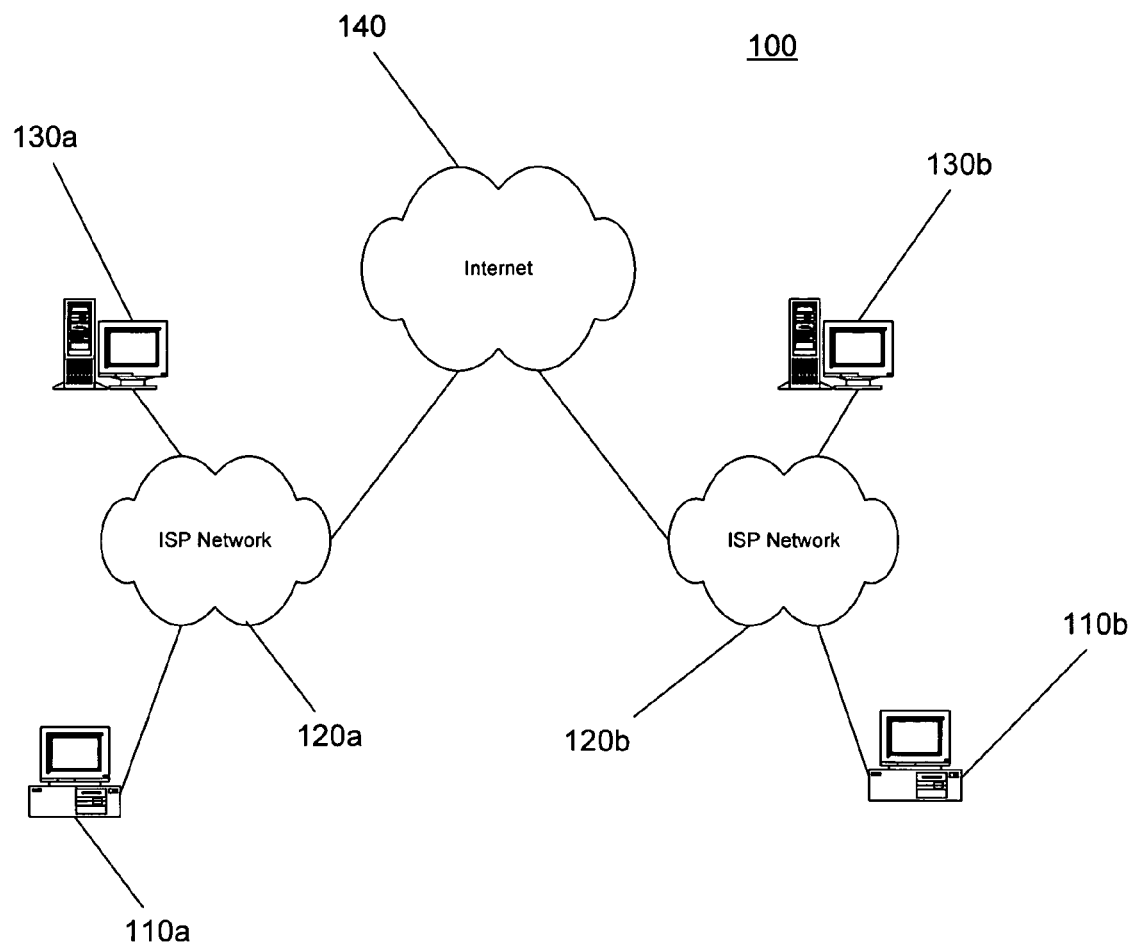
FIG. 1 is a block diagram of an exemplary networked computing environment that supports e-mail communications and in which spam filtering may be performed.

In a signature-based duplicate detection system, multiple different lexicons are used to generate a signature for a document that comprises multiple sub-signatures. Generally, in signature, or fingerprint, based duplicate detection systems, two documents are considered identical if their projections onto a lexicon of attributes are the same (where the attributes are typically those that have characteristics useful for identifying a given document). To determine whether the projections are the same, the projection of each document is normally mapped to a signature, and when two documents' signatures match, they are considered to be duplicates.

Such signature based techniques, however, may be sensitive to small changes in the content of a document, particularly when the change includes adding or subtracting from the document an attribute (e.g., a word) that is contained in the lexicon. Sensitivity to small word or other attribute changes may be particularly undesirable if the duplicate detection techniques are used in the context of spam-filtering. Spammers typical make small changes to the content of their spams, which may make a spam filtering system based on duplicate detection techniques less effective when the duplicate detection technique is sensitive to small changes in content.

To mitigate such sensitivity, multiple, different lexicons may be used, with the signature of an e-mail or other document being defined as the set of signatures generated based on the multiple different lexicons. In other words, a document's attributes may be projected onto multiple, different lexicons of attributes and the multiple projections used to generate a set of sub-signatures. The signature of the document is then defined as the set or collection of sub-signatures. When a collection of sub-signatures is used as a document's signature, two documents may be considered as being duplicates when a sub-signature generated based on a particular lexicon in the collection for the first document matches a signature generated based on the same lexicon in the collection for the second document.

Such duplicate detection techniques are described below as applied to e-mail spam filtering. However, the techniques may be used for spam filtering in other messaging media, including both text and non-text media. For example, spam may be sent using instant messaging or short message service (SMS), or may appear on Usenet groups. Similarly, the techniques may be applied, for instance, to filter spam sent in the form of images, sounds, or video when an appropriate set of attributes is selected.

Moreover, the techniques described may be applied to duplicate detection problems other than spam filtering. For example, duplicate detection of documents is also useful in Internet search engines and newsfeed applications. For Internet search engines, duplicate detection may be used to eliminate duplicate documents stored as part of the search engine database, or to eliminate duplicate documents from being returned to the user as part of the search results. For newsfeed applications, duplicate detection may be used to insure only on copy of a story is being fed to the user.

More generally, the described techniques may be applied to text or non-text items in a variety of document duplication applications. Therefore, the term "document" should be understood to generally refer to a computer file that contains data for use by applications, such as, for example, a file that contains text, images, sounds, video, other media, or a combination thereof. Accordingly, while described below as being text, the attributes may be text or non-text attributes such that the lexicons of attributes or unique attributes in a document may include both text and non-text attributes, only text attributes, or only non-text attributes.

FIG. 1 illustrates an exemplary networked computing environment 100 that supports e-mail communications and in which spam filtering may be performed. Computer users are distributed geographically and communicate using client systems 110a and 110b. Client systems 110a and 110b are connected to ISP networks 120a and 120b, respectively. While illustrated as ISP networks, networks 120a or 120b may be any network, e.g. a corporate network. Clients 110a and 110b may be connected to the respective ISP networks 120a and 120b through various communication channels such as a modem connected to a telephone line (using, for example, serial line internet protocol (SLIP) or point-to-point protocol (PPP)) or a direct network connection (using, for example, transmission control protocol/internet protocol (TCP/IP)). E-mail or other messaging servers 130a and 130b also are connected to ISP networks 120a and 120b, respectively. ISP networks 120a and 120b are connected to a global network 140 (e.g., the Internet) such that a device on one ISP network can communicate with a device on the other ISP network. For simplicity, only two ISP networks 120a and 120b have been illustrated as connected to Internet 140. However, there may be a large number of such ISP networks connected to Internet 140. Likewise, many e-mail servers and many client systems may be connected to each ISP network.

Each of the client systems 110a and 110b and e-mail servers 130a and 130b may be implemented using, for example, a general-purpose computer capable of responding to and executing instructions in a defined manner, a personal computer, a special-purpose computer, a workstation, a server, a device such as a personal digital assistant (PDA), a component, or other equipment or some combination thereof capable of responding to and executing instructions. Client systems 110a and 110b and e-mail servers 130a and 130b may receive instructions from, for example, a software application, a program, a piece of code, a device, a computer, a computer system, or a combination thereof, which independently or collectively direct operations. These instructions may take the form of one or more communications programs that facilitate communications between the users of client systems 110a and 110b. Such communications programs may include, for example, e-mail programs, IM programs, file transfer protocol (FTP) programs, or voice-over-IP (VoIP) programs. The instructions may be embodied permanently or temporarily in any type of machine, component, equipment, storage medium, or propagated signal that is capable of being delivered to a client system 110a and 110b or the e-mail servers 130a and 130b.

Each of client systems 110a and 110b and e-mail servers 130a and 130b includes a communications interface (not shown) used by the communications programs to send communications. The communications may include e-mail, audio data, video data, general binary data, or text data (e.g., data encoded in American Standard Code for Information Interchange (ASCII) format or Unicode).

Examples of ISP networks 120a and 120b include Wide Area Networks (WANs), Local Area Networks (LANs), analog or digital wired and wireless telephone networks (e.g., a Public Switched Telephone Network (PSTN), an Integrated Services Digital Network (ISDN), or a Digital Subscriber Line (xDSL)), or any other wired or wireless network including, e.g., a corporate LAN or WAN. Networks 120a and 120b may include multiple networks or subnetworks, each of which may include, for example, a wired or wireless data pathway.

Each of e-mail servers 130a and 130b may handle e-mail for users connected to ISP network 110a or 110b. Each e-mail server may handle e-mail for a single e-mail domain (e.g., aol.com), for a portion of a domain, or for multiple e-mail domains. While not shown, there may be multiple, interconnected e-mail servers working together to provide e-mail service.

An e-mail user, such as a user of client system 110a or 110b, typically has one or more e-mail mailboxes on an e-mail system, which may incorporate e-mail server 130a or 130b. Each mailbox corresponds to an e-mail address. Each mailbox may have one or more folders in which e-mail is stored. E-mail sent to one of the e-mail user's e-mail addresses is routed to the corresponding e-mail server 130a or 130b and placed in the mailbox that corresponds to the e-mail address to which the e-mail was sent. The e-mail user then uses, for example, an e-mail client program executing on client system 110a or 110b to retrieve the e-mail from e-mail server 130a or 130b and view the e-mail.

The e-mail client programs executing on client systems 110a and 110b also may allow one of the users to send e-mail to an e-mail address. For example, the e-mail client program executing on client system 110a may allow the e-mail user of client system 110a (the sending user) to compose an e-mail message and address the message to a recipient address, such as an e-mail address of the user of client system 110b. When the sender indicates the e-mail is to be sent to the recipient address, the e-mail client program executing on client system 110a communicates with e-mail server 130a to handle the sending of the e-mail to the recipient address. For an e-mail addressed to an e-mail user of client system 110b, for example, e-mail server 130a sends the e-mail to e-mail server 130b. E-mail server 130b receives the e-mail and places it in the mailbox that corresponds to the recipient address. The user of client system 110b may then retrieve the e-mail from e-mail server 130b, as described above.

In an e-mail environment such as that shown, a spammer typically uses an e-mail client or server program to send similar spam e-mails to hundreds, if not millions, of e-mail recipients. For example, a spammer may target hundreds of recipient e-mail addresses serviced by e-mail server 130b on ISP network 120b. The spammer may maintain the list of targeted recipient addresses as a distribution list. The spammer may use the e-mail program to compose a spam e-mail and instruct the e-mail program to use the distribution list to send the spam e-mail to the recipient addresses. The e-mail is then sent to e-mail server 130b for delivery to the recipient addresses. Thus, in addition to receiving legitimate e-mails, e-mail server 130b also may receive large quantities of spam e-mail, particularly when many hundreds of spammers target e-mail addresses serviced by e-mail server 130b.

Thus, e-mail systems tend to be used by any given spammer to send large numbers of substantially similar, although non-identical, e-mails. While the content of each spam e-mail contains essentially the same message, the content of each e-mail is normally varied to a degree. For example, mass e-mailings are often personalized by including the recipient user's first/last name or other personal information. Spammers also may add random text to their e-mails so as to foil some spam detection schemes, such as those based on matching exact textual strings in the e-mail. Usually, the core message of the e-mail remains the same, with random or neutral text added to confuse such "exact-match" spam filters. Often the extra text is inserted in such a way that it is not immediately visible to the users (e.g., when the font has the same color as the background). Other randomization strategies of spammers include: appending random character strings to the subject line of the e-mail, changing the order of paragraphs, or randomizing the non-alphanumeric content.

Furthermore, spammers also may change the words used in the e-mail to convey their message. However, because spam e-mails are typically oriented around the same topics (e.g., pornography), the expressiveness of their content is limited. Thus, even though spammers may attempt to randomize the content of their e-mails, the limitation on the expressiveness of their content results in essentially the same e-mail being sent out, even though the e-mails are not exactly identical.

Consequently, duplicate detection systems that identify nearly identical documents may be useful to filter spam e-mails, either when they enter an e-mail system or later on in the e-mail system (e.g., at the recipient's client system). Identification of spam e-mails at the entry point of an e-mail system may be particularly desirable from the e-mail service provider's perspective, as detection at that point may allow the e-mail service provider to prevent the propagation of such e-mails through the system, thereby reducing the waste of computation and storage resources on unsolicited messages.

Figure 2:
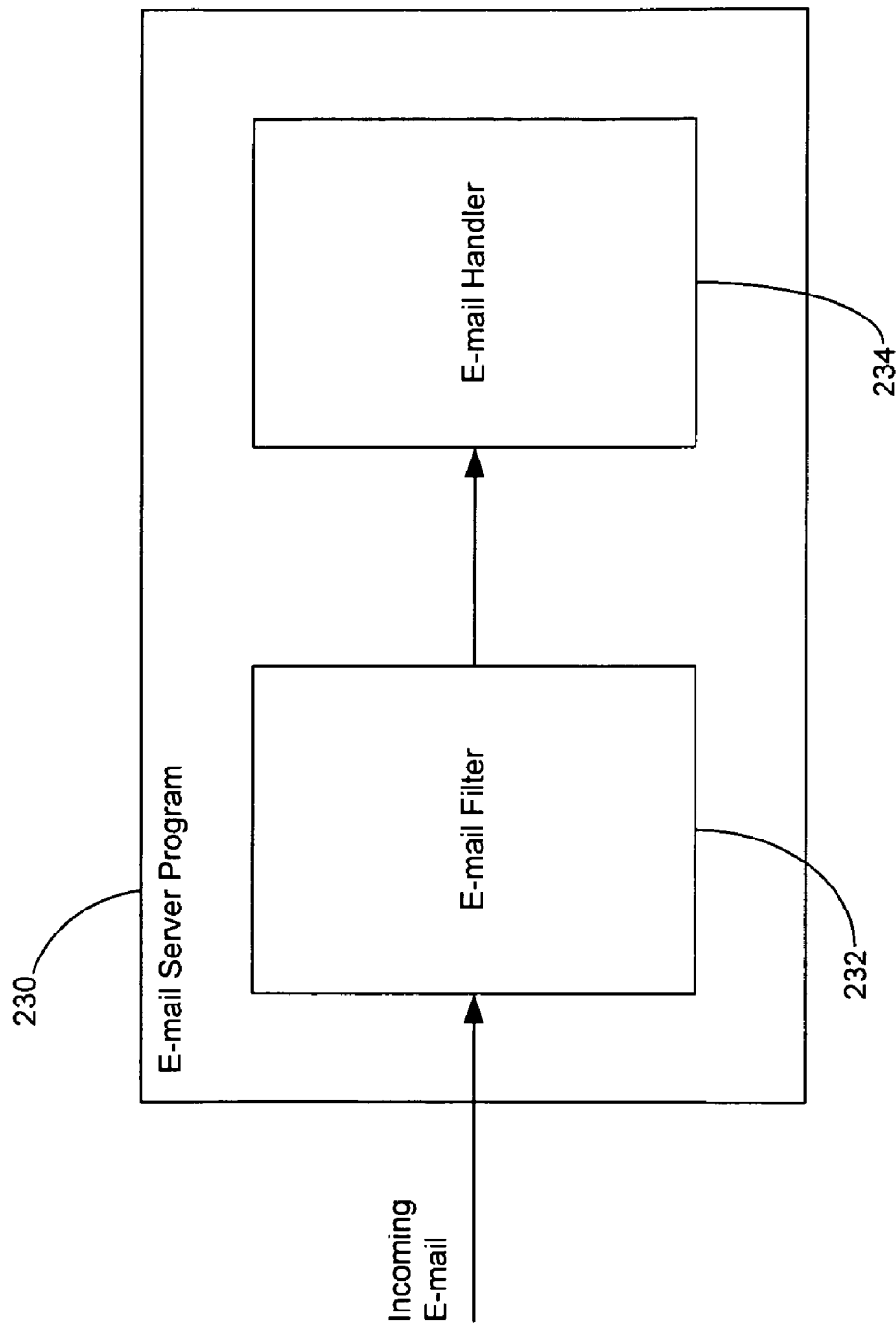
FIG. 2 is a high-level functional block diagram of an e-mail server program that may execute on an e-mail server to provide large-scale spam filtering.

Referring to FIG. 2, to provide spam filtering by duplicate detection at the entry point of an e-mail system, an e-mail server program 230 may execute on an e-mail system (which may incorporate e-mail server 130a or 130b). E-mail server program 230 includes an e-mail filter 232 and a mail handler 234. During operation, the incoming e-mail arriving at e-mail server program 230 is passed to e-mail filter 232. E-mail filter 232 applies duplicate detection techniques to the e-mail to determine whether the e-mail is a spam e-mail or a legitimate e-mail (i.e., not a spam e-mail) and forwards the e-mail to mail handler 234, along with an indication of whether the e-mail is spam or not.

Mail handler 234 then handles the e-mail in a manner that depends on the policies set by the e-mail service provider. For example, mail handler 234 may delete e-mails indicated as spam, while delivering e-mails marked as legitimate to an "inbox" folder of the corresponding e-mail account. Alternatively, e-mail labeled as spam may be delivered to a "spam" folder instead of being deleted.

Figure 3:
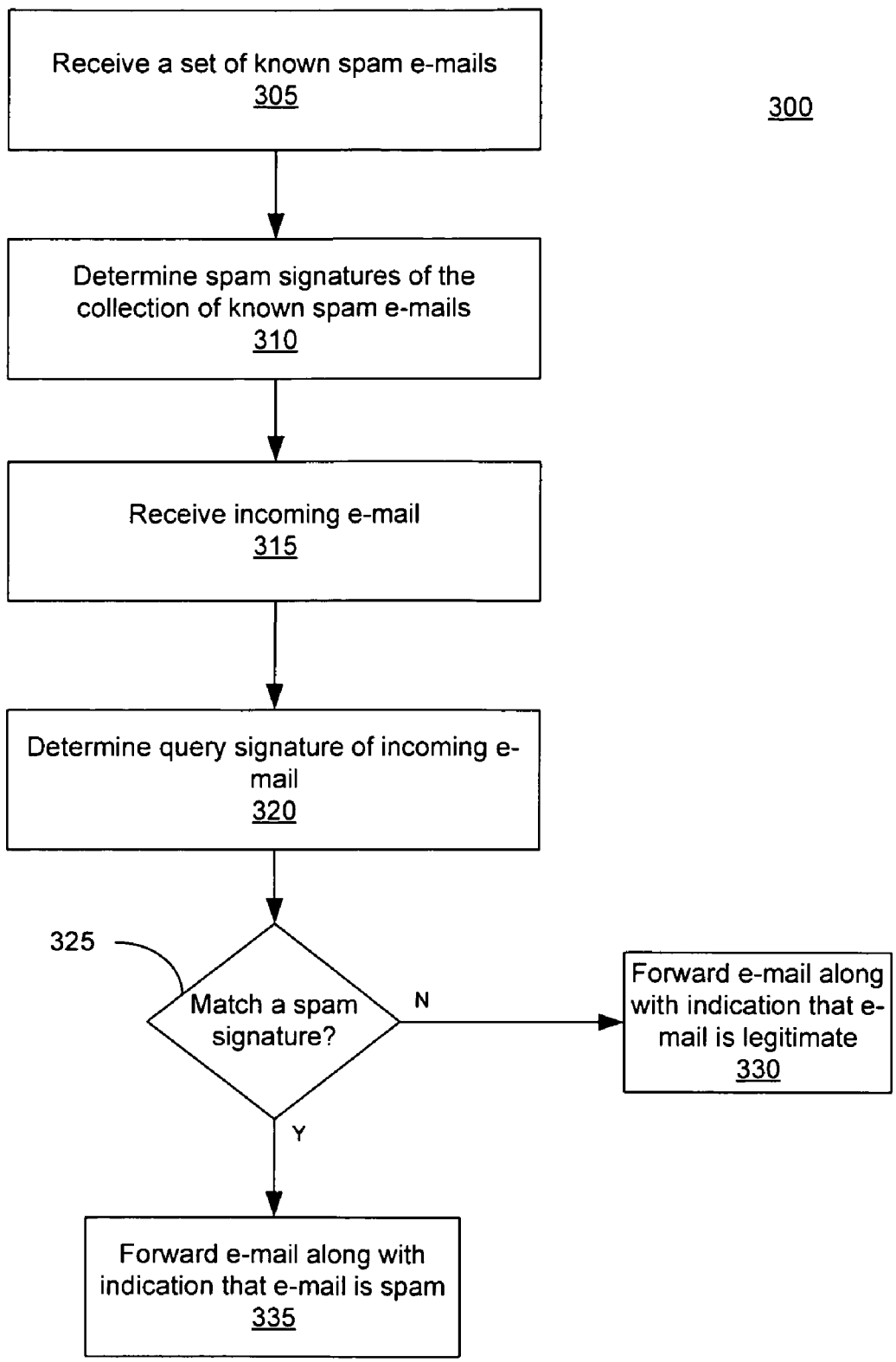
FIG. 3 is a flowchart of a process that may be employed by an e-mail filter to apply a single-signature-based duplicate detection technique to identify spam e-mails.

Referring to FIG. 3, a process 300 may be employed by e-mail filter 232 to apply a signature-based duplicate detection technique to identify spam e-mails. In signature, or fingerprint, based duplicate detection systems, two documents are considered to be the same if their projections onto a lexicon of attributes are the same (where the attributes are typically those that have characteristics useful for identifying a given document). To determine whether the projections are the same, the projection of each document is normally mapped to a signature, and when two documents' signatures match, they are considered to be duplicates.

For example, in the I-Match approach described by Chowdhury et al. in "Collection Statistics For Fast Duplicate Document Detection," *ACM Transactions on Information Systems,* 20(2):171-191, 2002 [hereinafter Chowdhury], two documents are considered to be the same if the projection of the unique words in the documents onto a lexicon of words is the same. To that end, a lexicon of words is developed, where the words chosen are those that have characteristics useful for specifically identifying a given document. More particularly, in I-Match, the lexicon is developed by examining a collection of documents and selecting the words in the collection that have a mid-range inverse document frequency (idf) or normalized inverse document frequency (nidf) (described more fully below).

For a given document, the set of unique words (i.e., each different word) in the document is identified. For example, if the word "cabin" is used in a document multiple times, it is listed once in the set of unique words. The intersection between the set of unique words and the lexicon is obtained (i.e., the words that are in both the lexicon and the set of unique words are identified). This intersection is then mapped to a single hash value using a hash algorithm such as the Secure Hash Algorithm 1 (SHA1) developed by the National Institute of Standards and Technology (described in Chowdhury and in RFC 3174, available at http://www.faqs.org/rfcs/rfc3174.html). If the hash value matches the hash value of another document, then the two documents are considered to be duplicates of one another.

Using such techniques, after a collection of known spam e-mails has been obtained, the signatures of the known spam e-mails may be calculated and then used to determine if new e-mails are duplicates of the known spam e-mails, and hence, are spam e-mails themselves. Accordingly, in process 300, a set of known spam e-mails is received by e-mail filter 232 (305).

The set of known spam e-mails may be collected in a number of ways. For example, "honeypot" e-mail accounts may be used to collect spam e-mails. A honeypot e-mail account is one set up by an e-mail service provider that does not belong to a legitimate user. The address of the honeypot account is then made available, for example, on websites, usenet groups, or other places where a spammer can obtain the address. Because a honeypot account does not belong to a legitimate user, it should not receive any legitimate e-mails; rather the e-mails received by that account should be spam e-mails. Another manner of collecting spam e-mails may include direct user feedback. To obtain direct user feedback, an e-mail service provider may implement tools or communication channels that allow its users to report spam e-mails that are received. This may be effective because at least some users may be eager to report and/or complain about received spam e-mails. Once a collection of spam e-mails is obtained, human analysts, for example, may review the e-mails to eliminate e-mails that are an exact duplicate of another e-mail in the set. The analysts also may eliminate e-mails that have the exact same message as another e-mail in the set (even though non-message randomization techniques have been applied to make the e-mails non-exact duplicates). The set of known spam e-mails is then provided to e-mail filter 232.

E-mail filter 232 then applies signature-based duplicate detection techniques to obtain a signature (a "spam signature") for each e-mail in the set of known spam e-mails (310). When the e-mail filter 232 subsequently receives an incoming e-mail (315), e-mail filter 232 applies the duplicate detection techniques to the incoming e-mail to obtain a signature of the e-mail (a "query signature") (320). E-mail filter 232 then compares the query signature to the spam signatures to determine if the query signature matches one of the spam signatures (325). If the query signature does not match a spam signature (325), then e-mail filter 232 forwards the incoming e-mail to e-mail handler 234 with an indication that the incoming e-mail is legitimate. On the other hand, if the query signature does match a spam signature (325), then the incoming e-mail is forwarded to the mail handler 234 with an indication that the e-mail is spam. E-mail handler 234 then handles the incoming e-mail accordingly.

Ideally, the signature of an e-mail or other document should be insensitive to small changes in the content of the document. Some signature-based techniques that use a document's projection onto a lexicon of attributes may not be insensitive to changes in a document's content that includes adding or removing an attribute that also is in the lexicon. For example, while the I-Match signature is inherently insensitive to changes in a document's word order, adding or subtracting a word from the document will change the value of the signature when the word is one that is also in the lexicon of words. Sensitivity to small word or other attribute changes is particularly undesirable in the context of spam-filtering, given the adversarial nature of spam filtering. In an attempt to circumvent any such duplicate detection spam filtering, a spammer may attempt to guess the composition of the lexicon and purposefully randomize messages with respect to the lexicon's contents. Even if a spammer does not purposefully randomize around the lexicon's contents, spammers still routinely randomize the content of their messages in small ways (as described above) and, consequently, a duplicate detection filtering system will be less effective when the duplicate detection technique is sensitive to small changes in content.

To mitigate such sensitivity, multiple, different lexicons may be used, with the signature of an e-mail or other document being defined as the set of signatures generated based on the multiple different lexicons. In other words, a document's attributes may be projected onto multiple, different lexicons of attributes and the multiple projections used to generate a set of sub-signatures. The signature of the document is then defined as the set of sub-signatures.

When multiple, different lexicons are used, a small modification to a document's content may change the signature based on one or more of the lexicons, but, at the same time, there may exist one or more of the lexicons for which the signatures are unaffected by such a change. A document's signature based on a particular lexicon may not change when the attributes changed in the document are not ones in the lexicon and, therefore, have no effect on the signature. Thus, a collection of signatures can be expected to be more stable than a single signature. When a collection of signatures is used as a document's signature, two documents may be considered as being duplicates when a signature generated based on a particular lexicon in the collection for the first document matches a signature generated based on the same lexicon in the collection for the second document.

Figure 4A:
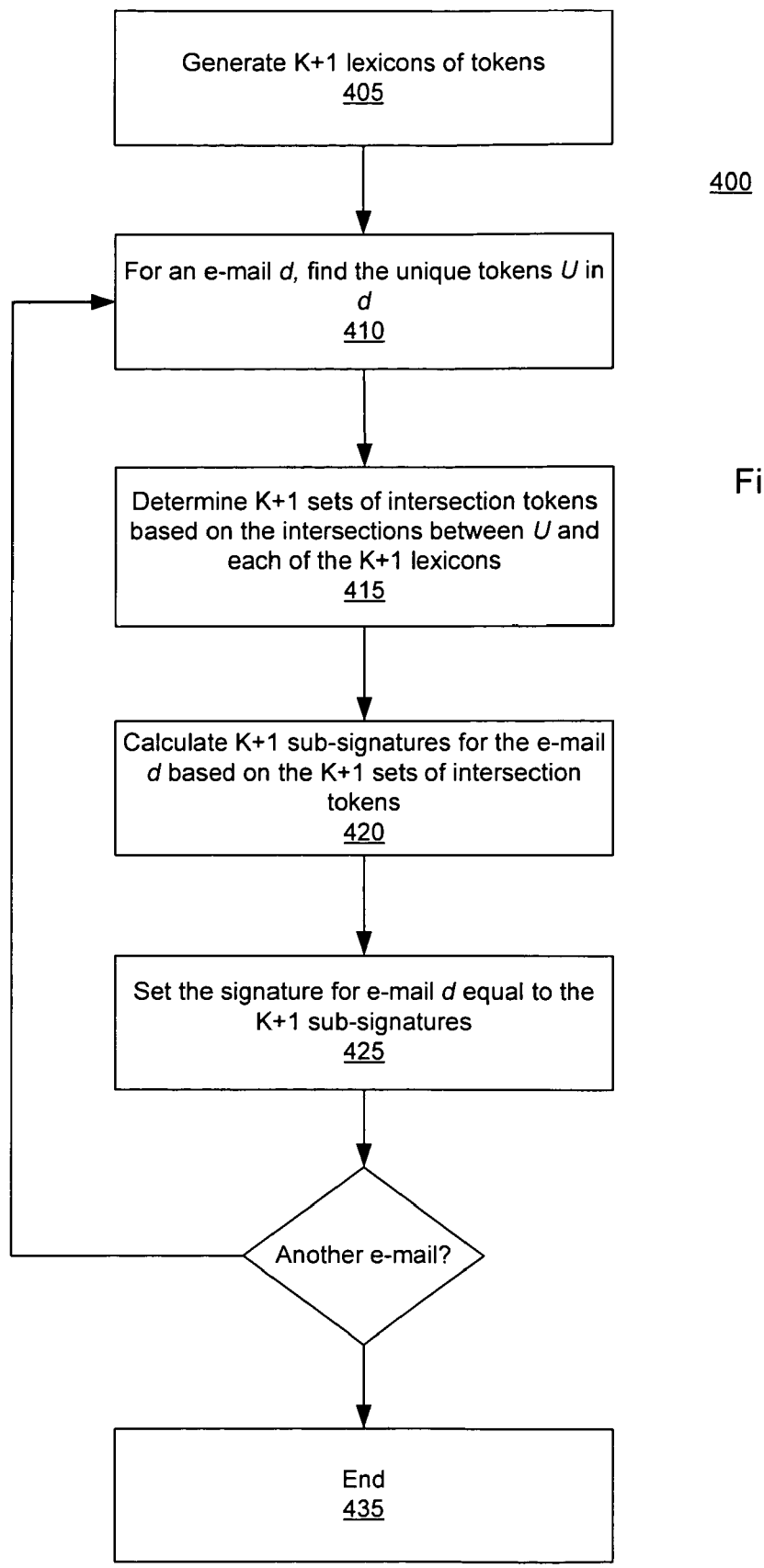
FIG. 4A is a flowchart of a process that may be used to implement actions 310 and 320 in FIG. 3 and which employs multiple different lexicons of attributes to mitigate sensitivity to small content changes.

Accordingly, referring to FIG. 4A, e-mail filter 232 may implement actions 310 and 320 by using a process 400, which employs multiple different lexicons of attributes to mitigate sensitivity to small content changes. The attributes may be, e.g., words, phrases or other clusters of words, HTML tags or other features contained in the body of an e-mail. A word may be defined as a set of alphanumeric characters delimited by whitespace. Additionally, the attributes may be tokenized.

First, K+1 different lexicons of tokens are generated (405). The K+1 lexicons contain tokens that have characteristics useful for specifically identifying a given document. For example, a lexicon may be created by analyzing a set of documents to identify by some measure, such as the idf or nidf (described below), those tokens that are most useful in identifying a document and selecting those tokens as the lexicon. The K+1 lexicons may be completely non-overlapping lexicons (i.e., do not contain any of the same tokens) or they may be partially overlapping (i.e., may have some tokens in common).

For a given e-mail d, e-mail filter 232 then determines the unique tokens U in e-mail d (410). When action 310 is implemented by process 400, e-mail d is one of the e-mails in the set of known spam e-mails. On the other hand, when action 320 is implemented by process 400, e-mail d is the incoming e-mail. To determine the unique tokens U, e-mail filter 232 may, for example, parse the body of e-mail d to tokenize the contents of the body and retain a given token if that token has not been encountered before in the body of e-mail d. In some implementations, e-mail filter 232 may only retain attributes that meet a certain criteria (e.g., is at least four characters long or has only one digit) and may apply a common formatting to the attributes (e.g., change all letters to lower case).

Next, e-mail filter 232 determines the intersection between unique tokens U and each of the K+1 lexicons to create K+1 sets of intersection tokens (where a set of intersection tokens contains the tokens that are in both U and the corresponding lexicon) (415). For example, in a system in which there are two lexicons, lexiconA and lexiconB, the intersection UA between U and lexiconA is determined (i.e., e-mail filter 232 determines which tokens in U are also in lexiconA) and the intersection UB between U and lexiconB is determined (i.e., e-mail filter 232 determines which tokens in U are also in lexiconB). Thus, 2 sets of intersection tokens, UA and UB, are created. UA contains the tokens in both U and lexiconA, while UB contains the tokens in both U and lexiconB.

K+1 sub-signatures are then generated based on the K+1 sets of intersection tokens (420) and the signature for e-mail d is set equal to the K+1 sub-signatures (430). Continuing the example above, a sub-signature SigUA is generated based on the set UA and a sub-signature SigUB is generated based on the set UB. The signature for e-mail d is then set equal to SigUA and SigUB.

To calculate a sub-signature from a set of intersection tokens, a hash algorithm that maps the set of intersection tokens to a single hash value may be used, where the single hash value is the sub-signature. For example, the SHA1 algorithm as described and implemented in Chowdhury may be used. The collection of sub-signatures for the e-mail are then stored as a spam signature or used as a query signature, depending on whether process 400 is implementing action 310 or 320. For example, the spam signature or query signature may be stored and manipulated as a (K+1)-tuple that contains the K+1 sub-signatures.

If there is another e-mail in the set of known spam e-mails or another incoming e-mail (depending on whether process 400 is implementing action 310 or 320) (430), then process 400 moves to action 410 to find the unique tokens in the other e-mail and the process continues as described above. Otherwise (430), process 400 is ended and the signature for e-mail d is then stored for future use as a spam signature or compared to a spam signature as a query signature (depending on whether process 400 is implementing action 310 or 320) (435).

Figure 4B:
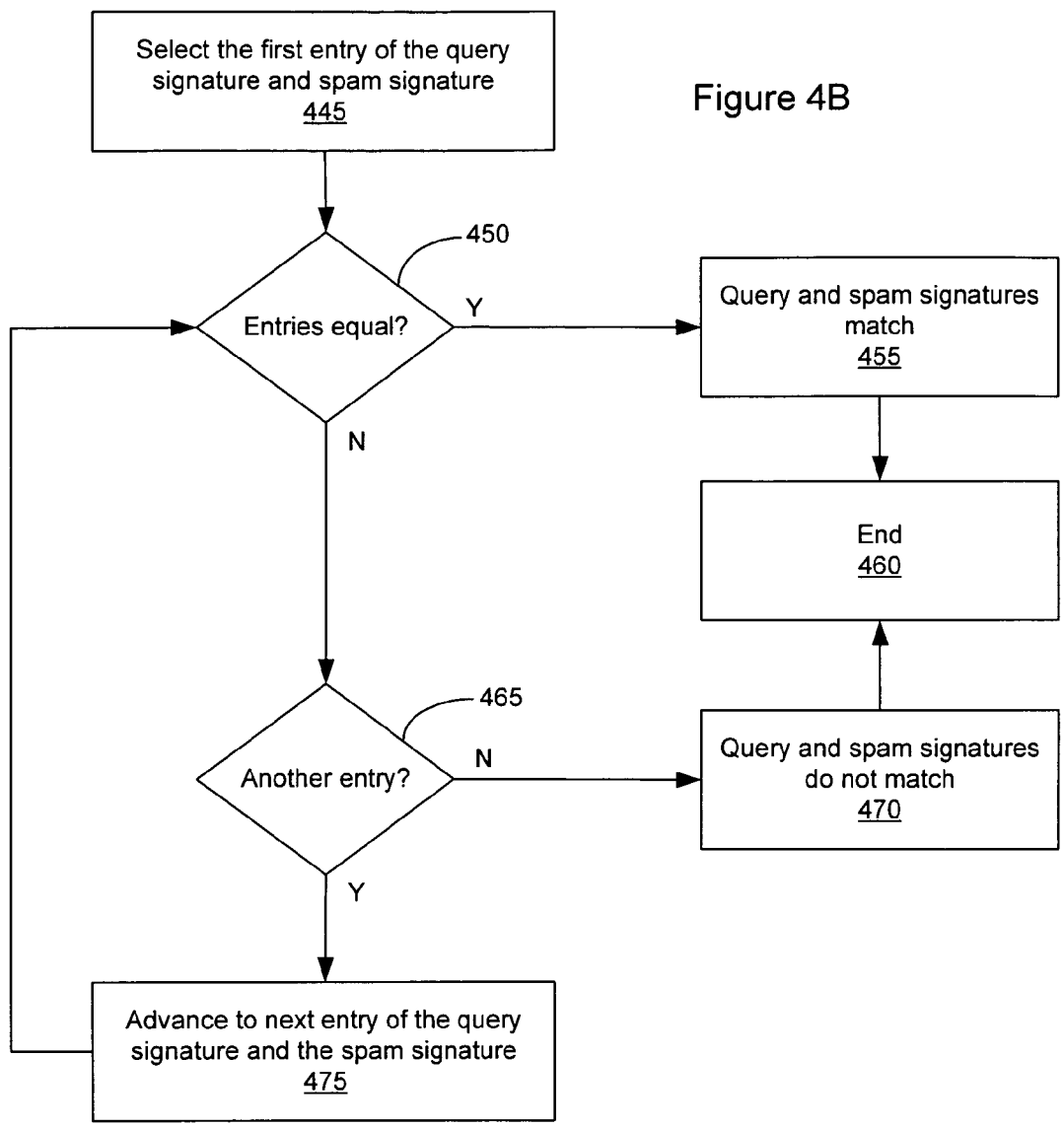
FIG. 4B is a flowchart of a process that may be used to implement action 325 in FIG. 3.

Referring to FIG. 4B, as described above, when a document's signature is set to the K+1 sub-signatures, two documents may be considered as being duplicates when a sub-signature generated based on a particular lexicon in the K+1 sub-signatures for the first document matches a sub-signature generated based on a the same lexicon in the K+1 sub-signatures for the second document. Accordingly, a process 440 may be used to implement action 325 when process 400 is used to implement actions 310 and/or 320.

The first entry (i.e., sub-signature) in the spam signature and the query signature is selected (445). These sub-signatures are compared to determine whether they are equal to one another (i.e., whether they are the same) (450). If they are the same, the query signature and the spam signature are considered as matching and process 440 ends (process 300 would then move to action 335). If they are not the same (450) and there is not another entry (i.e., another sub-signature) in the query and spam signatures (465), then the query and spam signatures are not considered to be the same (470) and process 440 ends. If there are no other spam signatures to compare the query signature to, then process 300 would then move to action 330.

On the other hand, if the first entries are not the same (450) and there is another entry (i.e., another sub-signature) in the query and spam signatures (465), then the next entry of the spam and query signatures is selected (475). These sub-signatures are likewise compared to determine whether they are equal to one another (450). If they are the same, the query signature and the spam signature are considered as matching and process 440 ends (process 300 would then move to action 335). If they are not the same (450) and there is not another entry in the query and spam signatures (465), then the query and spam signatures are not considered to be the same (470) and process 440 ends. If there are no other spam signatures to compare the query signature to, then process 300 would then move to action 330.

Process 440 then moves to action 475 again and continues in this fashion until a match occurs between sub-signatures or until there are no more sub-signatures.

Figure 4C:
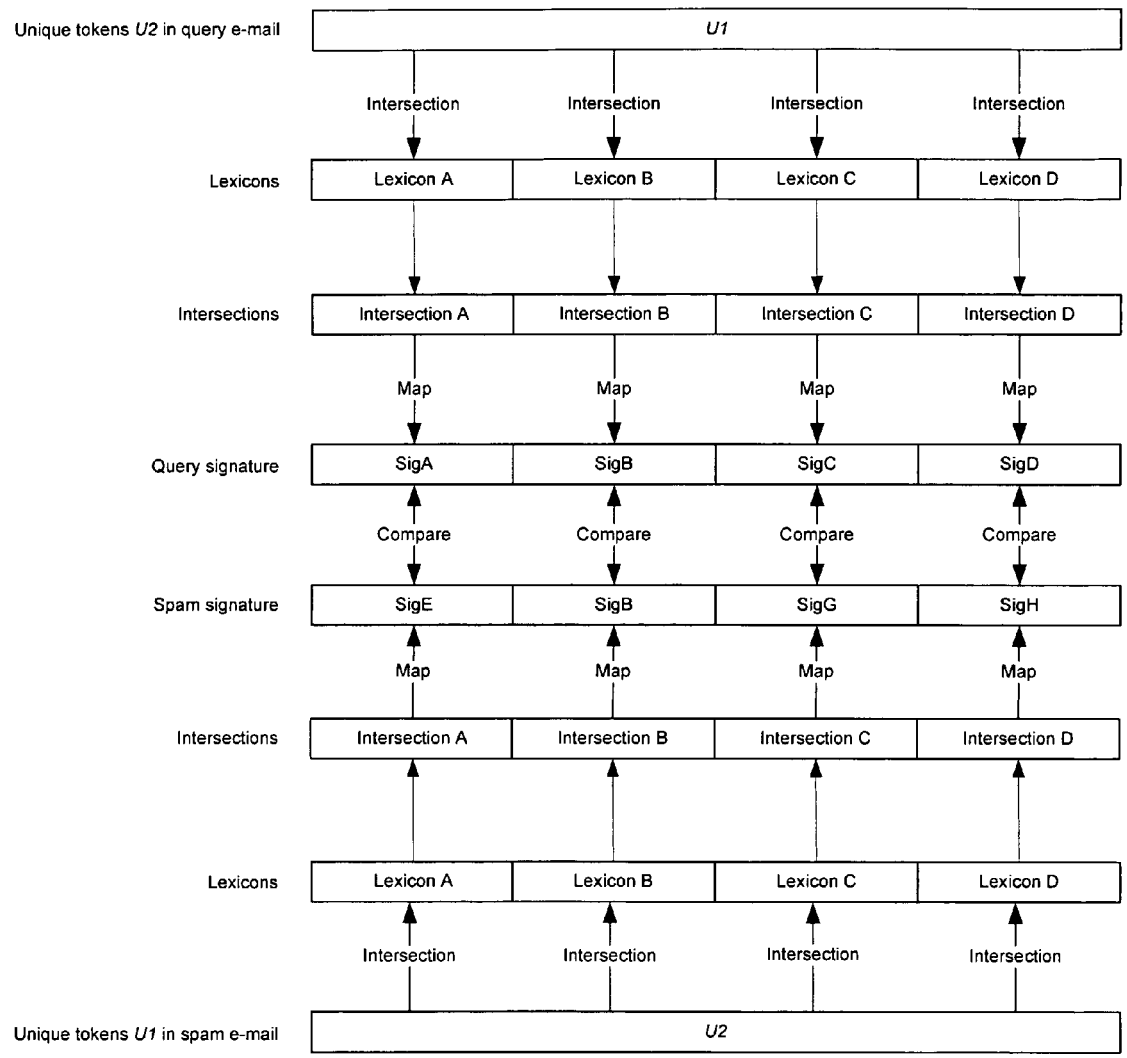
FIG. 4C is a diagram showing an exemplary operation of the processes in FIGS. 4A and 4B with respect to a spam e-mail and a query e-mail

Referring to FIG. 4C, shown is an exemplary operation of processes 400 and 440 with respect to a spam e-mail and a query e-mail. Four different lexicons are generated, namely, Lexicon A, Lexicon B, Lexicon C, and Lexicon D (405). The body of the spam e-mail is parsed to determine the unique tokens U1 in the spam e-mail (410). The intersection between U1 and Lexicon A is determined to obtain a set of intersection tokens A (designated as Intersection A) (415). Likewise, the intersection between U1 and Lexicon B, Lexicon C, and Lexicon D is determined to obtain a set of intersection tokens B, C, and D respectively (designated as Intersection B, Intersection C, and Intersection D) (415).

Intersection A is mapped to sub-signature SigE (420). Likewise, Intersection B is mapped to sub-signature SigB, Intersection C is mapped to sub-signature SigG, and Intersection D is mapped to sub-signature SigH (420). The collection of sub-signatures SigE, SigB, SigG, and SigH is considered to be the spam signature for the spam e-mail (425).

When the query e-mail is received, the body of the query e-mail is parsed to determine the unique tokens U2 in the query e-mail (410). The intersection between U2 and Lexicon A is determined to obtain a set of intersection tokens A (designated as Intersection A) (415). Likewise, the intersection between U2 and Lexicon B, Lexicon C, and Lexicon D is determined to obtain a set of intersection tokens B, C, and D respectively (designated as Intersection B, Intersection C, and Intersection D) (415).

Intersection A is mapped to sub-signature SigA (420). Likewise, Intersection B is mapped to sub-signature SigB, Intersection C is mapped to sub-signature SigC, and Intersection D is mapped to sub-signature SigD (420). The collection of sub-signatures SigA, SigB, SigC, and SigD is considered to be the query signature for the query e-mail (425).

Next, the first entries of the spam signature and the query signature are compared to determine if they are the same (445 & 450). Thus, SigA and SigE are compared. Because they are not the same (450) and there is another sub-signature (465), the next entries in the spam and query signatures are compared to determine if they are the same (475 & 450). Thus, SigB and SigB are compared. Because they are the same (450), the spam signature and the query signature are considered to match (455). Consequently, the query e-mail is treated as a duplicate of the spam e-mail and, hence, is treated as a spam e-mail (335). Had the second sub-signatures of the spam signature and query signature not been the same, then the query and spam signatures would not have been considered to match, as the other entries in the spam and query signatures are not the same. In this case, if there were no other spam signatures to compare the query signature to, then the query e-mail would have been treated as a non-duplicate of any of the known spam e-mails (and process 300 would move to 330).

FIG. 5 illustrates an exemplary implementation of action 405 for an implementation of process 400 based on the I-Match approach. A process 500 is used to generate the K+1 lexicons (action 405). In process 500, a set of documents is used to generate the lexicons. The set of documents may be a training set of documents, related or unrelated to spam e-mails, or the documents may be the set of known spam e-mails, or a combination of both. Even if a large diverse collection of training documents unrelated to spam e-mail is used to generate the lexicons, the lexicons may still be capable of being used to detect duplicates in the spam e-mails. In other words, lexicons generated from a large and diverse set of documents are capable of being used not only to detect duplicates of those documents in the collection, but also documents in different collections. For example, an experiment involved the use of lexicons created from a corpus of 1.6 million different web pages (which were previously used in the I-Match experiments described in Chowdhury). These lexicons were used in an implementation of process 400 and 440, with lexicon generation implemented as depicted in FIG. 5, and performed well. This experiment is described in greater detail in U.S. Provisional Patent Application Ser. No. 60/543, 283, filed on Feb. 11, 2004.

The ability to use a training collection that can be applied to detect documents in different collections may be useful in the context of spam filtering because the content distribution of spam is constantly changing (i.e., the content or topics of spam are constantly changing). The ability to use a training collection for different documents means that the lexicon(s) do not need to be constantly updated as spam changes; rather, as long as the signatures for the new spam e-mails are calculated and used, e-mail filter 232 should continue to operate well even as the content of spam changes.

Accordingly, in process 500, a set of training documents (related to or unrelated to spam e-mail) is obtained (505), the set of known spam e-mails is used instead (510), or a combination of the two is used to generate the lexicons. To do so, the set of documents used is parsed to obtain the unique tokens in the set of documents (515). Next, the normalized inverse document frequency (nidf) of the unique tokens in the set is calculated (520) according to:

$$NIDF_i \frac{IDF_i}{\max IDF}, IDF_i = \log \frac{N}{n_i}$$

where N is the total number of documents in the set, $n_i$ is the number of documents in the used set that contain token i, and max IDF is the maximum IDF value for the unique tokens. Thus, for example, to calculate the nidf for a particular token, e-mail filter 232 may initially calculate the IDF for all of the unique tokens and then divide the idf for the particular token by the maximum idf value.

Once the nidfs for the unique tokens in the set of documents are calculated, the unique tokens that have nidfs between a specified range are selected (525) and used as a primary lexicon (530). Generally, tokens with mid-range nidfs are considered to be the ones that are most useful in identifying a particular document. In other words, those tokens that occur very frequently in the set and those that occur infrequently are generally not considered to be as useful in identifying a particular document. Accordingly, the range is generally specified to span those tokens with mid-range nidfs. The exact choice of the specified range is generally in the discretion of the system designer and may involve a degree of trial and error to determine the range that is most useful in a particular system. An exemplary range that may be suitable in some systems is the range of nidfs between 0.2 and 0.3.

Next, the other K lexicons are obtained by eliminating a random fraction p of tokens from the primary lexicon (i.e., the K extra lexicons are proper subsets of the primary lexicon) (535). While other independent lexicons may be generated according to actions 505-530 and used as the other K lexicons (in lieu of performing action 535), in practice, obtaining a number of independent lexicons may be non-trivial. However, if a lexicon is modified by a small number of deletions, this is unlikely to significantly change the stability of signatures with respect to the modified lexicon. Thus, by making a number of different deletions of a small fraction p of tokens from the primary lexicon, additional lexicons can be created. Assuming that p is small, the values of signatures due to the additional lexicons should be similar to the original.

When generating the additional lexicons by deleting a small fraction of tokens, the sensitivity of the extended signature (i.e., the set of sub-signatures) to content alterations may be expressed as:

$$1-(1-p^n)^K \qquad \text{Eq. (1).}$$

This is derived by considering a message that is modified by randomly removing a token that is also in the primary lexicon, with n such changes in total (note that changes involving tokens not in the primary lexicon do not affect the extended signature). Each such change will necessarily change the sub-signature obtained from the primary lexicon, whereas the probability that at least one of the K additional sub-signatures will be unaffected by such a change can be estimated according to Eq. (1) above. Thus, Eq. (1) provides a measure of the sensitivity of the extended signature to changes in content that affect the sub-signature obtained from the primary lexicon. As p increases, there is a greater chance that one of the signatures will be unaffected by a change in a message that involves a token from the primary lexicon.

On the other hand, as p is increased, there is a greater chance for a false positive (i.e., a message that is not a duplicate being considered as a duplicate). Accordingly, p is generally optimized through validation such that the sensitivity is minimized while staying within the design constraints of the system regarding false positives.

In other implementations, the additional lexicons may be generated by substituting some tokens in the primary lexicon with other tokens whose characteristics are useful in detecting duplicates.

Referring again to FIG. 4A, when process 400 is implemented based on an I-Match approach, after the unique tokens U in an e-mail is determined (410), the intersection between the unique tokens U and each of the primary lexicon and the K subset lexicons is determined to create K+1 sets of intersection tokens (415). Each of the K+1 sets of intersection tokens is then used to calculate a sub-signature (420). To calculate the sub-signatures, a hash algorithm that maps a set of intersection tokens to a single hash value is used on each of the K+1 sets of intersection tokens, where the single hash value generated from a set of intersection tokens is the sub-signature. For example, the SHA1 algorithm as described and implemented in Chowdhury may be used. The signature of the e-mail is then set to the collection of hash values (425), which is then stored as a spam signature or used as a query signature, depending on whether process 400 is implementing action 310 or 320.

The above-described techniques also may be used as an integrated system of spam filtering. For example, the duplicate detection techniques may be used to quickly identify and eliminate near-duplicates of spam e-mail at the entry point of an e-mail system. The e-mails that are not identified as spam based on duplicate detection may then be classified using, for instance, machine learning techniques. To that end, the e-mails may be provided to a naïve Bayesian classifier or a Support Vector Machine (SVM) based classifier, for instance, which then evaluates the e-mail content and classifies the e-mail as spam or non-spam. Thus, in the system of FIG. 2, for example, mail handler 234 may forward the e-mail that is indicated as not being spam to a classifier for classification as spam or non-spam.

The techniques described above are not limited to any particular hardware or software configuration. Rather, they may be implemented using hardware, software, or a combination of both. The methods and processes described may be implemented as computer programs that are executed on programmable computers comprising at least one processor and at least one data storage system. The programs may be implemented in a high-level programming language and may also be implemented in assembly or other lower level languages, if desired.

Any such program will typically be stored on a computer-usable storage medium or device (e.g., CD-Rom, RAM, or magnetic disk). When read into the processor of the computer and executed, the instructions of the program cause the programmable computer to carry out the various operations described above.

A number of implementations have been described. Nevertheless, it will be understood that various modifications may be made. For example, in some places in the foregoing description an action is described as performed on each e-mail in a group (e.g., a spam signature is obtained for each e-mail in the set of known spam e-mails); however, the performance of the actions on each e-mail is not necessarily required. For instance, with respect to spam signatures, a spam signature may not be obtained for each known spam e-mail because of certain restrictions placed on signatures, such as a requirement that the intersection be above a threshold before a signature is generated (in order to insure reliability of the signatures). Thus, if the intersection between the unique tokens in a particular spam e-mail and the lexicons is below a certain threshold, then the e-mail may be ignored and a signature not generated for it. Similarly, there may be restrictions on the number of unique tokens required. For instance, a spam e-mail may be required to contain a minimum number of unique tokens (e.g., 5) before it is used.

Additionally, in other implementations where the foregoing techniques are applied to spam filtering in other messaging media or other areas of classification, the attributes may be other features of the particular items being classified. For instance, the attributes may be n-grams, image features, sound features, or features extracted from other forms of media.

Accordingly, implementations other than those specifically described are within the scope of the following claims.

What is claimed is:

1. A method used in detecting a duplicate document, the method comprising:
    generating at least a first and second lexicon of attributes, the second lexicon being generated by eliminating a random fraction of attributes from the first lexicon independently of a characteristic of the attributes in the first lexicon;
    determining unique attributes in a document;
    determining a first set of intersection attributes based on an intersection between the unique attributes in the document and the first lexicon;
    determining a second set of intersection attributes based on an intersection between the unique attributes in the document and the second lexicon;
    calculating a first sub-signature based on the first set of intersection attributes;
    calculating a second sub-signature based on the second set of intersection attributions;
    setting a signature of the document to include the first and second sub-signatures; and
    accessing a second signature associated with a second document, the second signature including a third sub-signature calculated based on an intersection between unique attributes in the second document and the first lexicon, and a fourth sub-signature calculated based on an intersection between unique attributes in the second document and the second lexicon; and
    if the first sub-signature matches the third sub-signature or if the second sub-signature matches the fourth sub-signature, determining that the document and the second document are duplicates.

2. The method of claim 1 wherein generating the first lexicon of attributes and the second lexicon of attributes comprises:
    parsing a set of documents to obtain unique attributes in the set of documents;
    calculating the normalized inverse document frequency for the unique attributes in the set of documents;
    selecting the unique attributes in the set of documents that have a normalized inverse document frequency within a selected range; and
    generating the first lexicon from the selected unique attributes.

3. The method of claim 2 wherein the set of documents is a set of known spam e-mails.

4. The method of claim 2 wherein the set of documents is a set of training documents.

5. The method of claim 1 wherein the document is an e-mail.

6. The method of claim 5 wherein the unique attributes comprise tokens.

7. The method of claim 6 wherein the tokens comprise words in a body of the e-mail.

8. The method of claim 5 wherein the e-mail is a known spam e-mail and the signature of the known spam e-mail is a spam signature for use in detecting a duplicate spam e-mail.

9. The method of claim 1 wherein the attributes in the first and second lexicons and the unique attributes comprise words.

10. The method of claim 1 wherein the document is an unknown document and the signature is a query signature, the method further comprising comparing the query signature to known signatures generated from a set of known documents to determine whether the unknown document is a duplicate of one of the set of known documents.

11. The method of claim 10 wherein comparing the query signature to known signatures generated from a set of known documents comprises determining whether a sub-signature in the query signature is the same as a sub-signature in one of the known signatures.

12. The method of claim 11 wherein determining if a sub-signature in the query signature is the same as a sub-signature in one of the known signatures comprises determining whether a sub-signature in the query signature that was generated based on an intersection between the unique tokens and one of the multiple lexicons is the same as a sub-signature in the known signature that was generated based on an intersection between unique tokens in a known document and the same one of the multiple lexicons.

13. A computer-usable medium storing a computer program used in detecting a duplicate document, the computer program comprising instructions for causing a computer to perform the following operations:
    generate at least a first and second lexicon of attributes, the second lexicon being generated by eliminating a random fraction of attributes from the first lexicon independently of a characteristic of the attributes in the first lexicon;

determine unique attributes in a document;

determine a first set of intersection attributes based on an intersection between the unique attributes in the document and the first lexicon;

determine a second set of intersection attributes based on an intersection between the unique attributes in the document and the second lexicon;

calculate a first sub-signature based on the first set of intersection attributes;

calculate a second sub-signature based on the second set of intersection attributions;

set a signature of the document to include the first and second sub-signatures; and access a second signature associated with a second document, the second signature including a third sub-signature calculated based on an intersection between unique attributes in the second document and the first lexicon, and a fourth sub-signature calculated based on an intersection between unique attributes in the second document and the second lexicon; and if the first sub-signature matches the third sub-signature or if the second sub-signature matches the fourth sub-signature, determine that the document and the second document are duplicates.

14. The medium of claim 13 wherein, to generate the first lexicon of attributes and the second lexicon of attributes, the computer program further comprises instructions for causing a computer to:

parse a set of documents to obtain unique attributes in the set of documents;

calculate the normalized inverse document frequency for the unique attributes in the set of documents;

select the unique attributes in the set of documents that have a normalized inverse document frequency within a selected range; and generate the first lexicon from the selected unique attributes.

15. The medium of claim 13 wherein the document is an unknown document and the signature is a query signature, the computer program further comprising instructions for causing a computer to compare the query signature to known signatures generated from a set of known documents to determine whether the unknown document is a duplicate of one of the set of known documents.

16. The medium of claim 15 wherein, to compare the query signature to known signatures generated from a set of known documents, the computer program further comprises instructions for causing a computer to determine whether a sub-signature in the query signature is the same as a sub-signature in one of the known signatures.

17. The medium of claim 16 wherein, to determine if a sub-signature in the query signature is the same as a sub-signature in one of the known signatures, the computer program further comprises instructions configured to cause a computer to determine whether a sub-signature in the query signature that was generated based on an intersection between the unique tokens and one of the multiple lexicons is the same as a sub-signature in the known signature that was generated based on an intersection between unique tokens in a known document and the same one of the multiple lexicons.

18. An apparatus used in detecting a duplicate document, the apparatus comprising:

means for generating at least a first and second lexicon of attributes, the second lexicon being generated by eliminating a random fraction of attributes from the first lexicon independently of a characteristic of the attributes in the first lexicon, one or more processing devices and a computer-readable medium coupled to the one or more processing devices, the medium storing instructions which, when executed by the one or more processing devices, cause the one or more processing devices to perform operations comprising:

determining unique attributes in a document;

determining a first set of intersection attributes based on an intersection between the unique attributes in the document and the first lexicon;

determining a second set of intersection attributes based on an intersection between the unique attributes in the document and the second lexicon;

calculating a first sub-signature based on the first set of intersection attributes;

calculating a second sub-signature based on the second set of intersection attributions;

setting a signature of the document to include the first and second sub-signatures; and accessing a second signature associated with a second document, the second signature including a third sub-signature calculated based on an intersection between unique attributes in the second document and the first lexicon, and a fourth sub-signature calculated based on an intersection between unique attributes in the second document and the second lexicon; and if the first sub-signature matches the third sub-signature or if the second sub-signature matches the fourth sub-signature, determining that the document and the second document are duplicates.

* * * * *